(12) United States Patent  
Browne et al.

(10) Patent No.: US 9,157,398 B2
(45) Date of Patent: Oct. 13, 2015

(54) OVERLOAD PROTECTION LACKING AUTOMATIC RESET FOR USE WITH ACTIVE MATERIAL ACTUATION

(75) Inventors: Alan L. Browne, Grosse Pointe, MI (US); Nancy L. Johnson, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 190 days.

(21) Appl. No.: 13/621,139

(22) Filed: Sep. 15, 2012

(65) Prior Publication Data

US 2014/0077921 A1  Mar. 20, 2014

(51) Int. Cl.
*F02M 35/00* (2006.01)

(52) U.S. Cl.
CPC ..................................... *F02M 35/00* (2013.01)

(58) Field of Classification Search
CPC ....................................................... F02M 35/00
USPC ....................... 361/139, 143–145, 206; 403/2; 60/527–529
See application file for complete search history.

(56) References Cited

U.S. PATENT DOCUMENTS

| | | | |
|---|---|---|---|
| 7,597,616 B2 * | 10/2009 | Browne et al. | 454/155 |
| 7,909,403 B2 * | 3/2011 | Lawall et al. | 297/284.9 |
| 2008/0100071 A1 * | 5/2008 | Browne et al. | 292/341.17 |
| 2009/0173305 A1 * | 7/2009 | Alexander et al. | 123/184.53 |
| 2010/0326070 A1 * | 12/2010 | Hao et al. | 60/527 |
| 2013/0242451 A1 * | 9/2013 | Johnson et al. | 361/139 |

* cited by examiner

*Primary Examiner* — Daniel Wiley

(57) ABSTRACT

An actuation assembly adapted to protect against overload conditions, includes an active material actuator and an active material overload protection device either with or without a manual reset.

16 Claims, 2 Drawing Sheets

OVERLOAD PROTECTION LACKING AUTOMATIC RESET FOR USE WITH ACTIVE MATERIAL ACTUATION

BACKGROUND OF THE INVENTION

1. Field of the Invention

The present disclosure generally relates to devices for and methods of protecting an active material actuator against overload conditions; and more particularly, to a device for and method of overload protection that lacks an automatic reset in accomplishing the same.

2. Discussion of Prior Art

Active material actuators, such as shape memory alloy (SMA) wires, are generally protected from mechanical overload by the use of mechanical springs or electrical/controls schemes to avoid damage to the actuators when the output load exceeds a recommended limit. To service the actuator over its life, these measures often feature automatic resets that present various concerns in the art. Most notably, it is appreciated that the added functionality of automatic resets increase the complexity, packaging space, and costs associated with overload protection, and with respect to springs, present an increasing biasing force that must be overcome by the actuator. Moreover, as a result of automatic resets, overload events may go undetected, thereby exposing the actuator and driven mechanism to a continuous condition. More simplistic non-automatically resetting overload protection mechanisms have been developed, including end crimps designed to release an SMA wire when the load exceeds a specified level; however, these mechanisms also present concerns. For example, where releasable crimps are used, it is appreciated that wire damage may occur as the wire is stripped from the crimp.

BRIEF SUMMARY OF THE INVENTION

There remain many situations/applications in which it is desirous to omit an automatic reset while maintaining overload protection for active material actuators, for example, where packaging space is limited or where it is desirous to limit device complexity. As an overload protection device, the invention offers a secondary path for work output for active material actuators, such as shape memory alloy wires, and the mechanisms driven thereby, where the driven load actually exceeds or is predicted to exceed the maximum available output or structural capacity of the actuator (or a safe portion thereof). Depending on the embodiment, prevention of damage to and thus reduction of cycle life of active material actuators and/or prevention of actuation in situations in which actuation is undesirable is facilitated. Where the overload protection device is further formed of an active material, the invention is useful for offering plural overload protection thresholds, for example, during non-use (e.g., where the driven mechanism is locked in place and subject to acceleration/deceleration acting upon a vehicle) and during actuation (e.g., where the mechanism is released and the driven component is subject to damage at a lower threshold). Moreover, through activation, the invention is useful for offering a non-linear overload protection force that reduces the stress load in the actuator and thus delivered to the mechanism to which it is connected after the onset of overload protection.

In general, an active material actuator assembly exposable to a first load, and adapted to protect against overload conditions is presented. The assembly includes an active material actuator having opposite work and fixed ends, and drivenly coupled to the load at the work end, and an overload protection device communicatively coupled to the actuator at the fixed end. The device is operable to occlude the actuator from the load, when the load exceeds a predetermined threshold. Lastly, the assembly does not include an automatic reset, such that the actuator is exposable to a second load only when manually reset or the active element is replaced.

The disclosure, including applications wherein the overload protection device is formed of shape memory polymer (SMP) or Austenitic SMA, and presents a link comprising an oblong or spherically shaped SMP body or an active material hook and loop connection, may be understood more readily by reference to the following detailed description of the various features of the disclosure and the examples included herein.

BRIEF DESCRIPTION OF THE SEVERAL VIEWS OF THE DRAWING

A preferred embodiment(s) of the invention is described in detail below with reference to the attached drawing figures of exemplary scale, wherein.

DETAILED DESCRIPTION OF THE INVENTION

Figure 1:
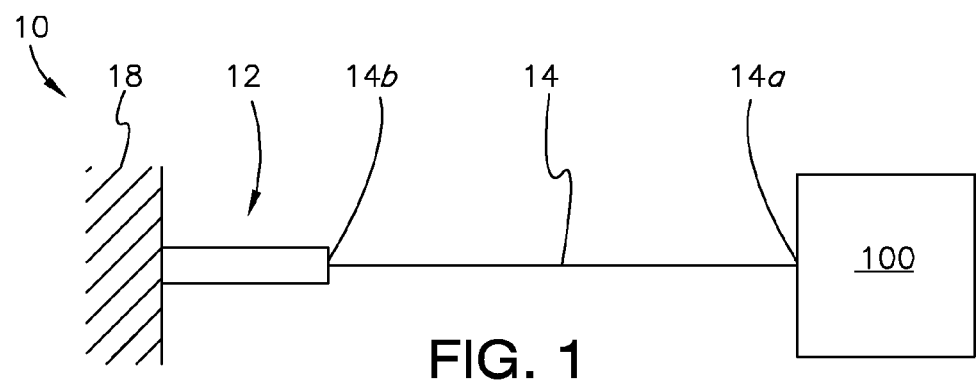
FIG. 1 is a schematic elevation of an assembly comprising an active material actuator having drivenly attached thereto an overload protection device at a fixed end and a load at a work end, in accordance with a preferred embodiment of the invention.

The following description of the preferred embodiments is merely exemplary in nature and is in no way intended to limit the invention, its application, or uses. Referring to FIGS. 1-4a, the present invention concerns a novel actuation assembly 10 comprising an overload protection device 12 and actuator 14, and more particularly, an active material device and actuator. As generally shown in FIG. 1, the assembly 10 is configured to drive a load 100 and provide mechanical overload protection when the load 100 is greater than the actuation force or structural capacity offered by the actuator 14 or is otherwise unsafe for the mechanism being driven thereby. Whereas conventional mechanical overload protection devices offer automatic resets, this disclosure offers novel examples of actuator assemblies 10 that employ active and/or nonactive materials for overload protection and that have no automatic reset. As a result, the invention provides simpler, less invasive, and more cost effective solutions than conventional counterparts where applicable, and offers means for load limiting that contemplate the full range of approaches including where the actuator is damaged to the point that it must be replaced to approaches which merely require a simple manual reset.

The invention may be applied wherever automatically resetting the actuator 14 is untenable (e.g., where the mechanism or base structure drivenly attached thereto was protected but the actuator 14 was destroyed), or sufficient opportunity is provided to detect the past occurrence of an overload condition and to manually reset the assembly 10 for future use. The invention is suitable for use by any actuator 14 that defines a stroke, presents a maximum actuation force, and is susceptible to overloading. In an automotive or commercial setting, for example, the actuation assembly 10 may be used to drive at least one exterior vent cover (not shown) susceptible to obstruction by snow, ice, mud, or the like. As previously mentioned, the present invention is particularly suited for use with active material actuators 14, such as, for example, a shape memory alloy wire, electroactive polymer tendon, or the like.

As used herein the term "active material" is defined as any of those materials or composites that exhibit a reversible change in fundamental (i.e., chemical or intrinsic physical) property when subjected to an activation signal. Suitable active materials for use as an actuator include but are not limited to shape memory materials that have the ability to remember their original at least one attribute such as shape, which can subsequently be recalled by applying an external stimulus. Exemplary active materials for use as actuators include, but are not limited to, shape memory alloys (SMA), shape memory polymer (SMP), shape memory ceramics, electroactive polymers (EAP), ferromagnetic SMA's, high volume paraffin wax, piezoelectric composites, and the like.

Shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. Generally, in the low temperature, or Martensite phase, shape memory alloys can be pseudo-plastically deformed and upon exposure to some higher temperature will transform to an Austenite phase, or parent phase, and return, if not under stress, to their shape prior to the deformation.

Shape memory alloys exist in several different temperature-dependent phases. The most commonly utilized of these phases are Martensite and Austenite phases. In the following discussion, the Martensite phase generally refers to the more deformable, lower temperature phase whereas the Austenite phase generally refers to the more rigid, higher temperature phase. When the shape memory alloy is in the Martensite phase and is heated, it begins to change into the Austenite phase. The temperature at which this phenomenon starts is often referred to as Austenite start temperature ($A_s$). The temperature at which this phenomenon is complete is called the Austenite finish temperature ($A_f$).

When the shape memory alloy is in the Austenite phase and is cooled, it begins to change into the Martensite phase, and the temperature at which this phenomenon starts is referred to as the Martensite start temperature ($M_s$). The temperature at which Austenite finishes transforming to Martensite is called the Martensite finish temperature ($M_f$). Thus, a suitable activation signal for use with shape memory alloys is a thermal activation signal having a magnitude sufficient to cause transformations between the Martensite and Austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the Martensite to Austenite phase transformation, and the material will recover the original, annealed shape. Hence, one-way shape memory effects are only observed upon heating. Active materials comprising shape memory alloy compositions that exhibit one-way memory effects do not automatically cycle with temperature changes back and forth between two shapes, and require an external mechanical force to deform the shape away from its memorized or taught geometry.

Intrinsic and extrinsic two-way shape memory materials are characterized by a shape transition both upon heating from the Martensite phase to the Austenite phase, as well as an additional shape transition upon cooling from the Austenite phase back to the Martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Once the material has been trained to exhibit the two-way shape memory effect, the shape change between the low and high temperature states is generally reversible and persists through a high number of thermal cycles. In contrast, active materials that exhibit the extrinsic two-way shape memory effect are composite or multi-component materials. They combine an alloy that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

Thus, for the purposes of this invention, it is appreciated that SMA's exhibit a modulus increase of approximately 2.5 times and a dimensional change of up to 8% (depending on the amount of pre-strain) when heated above their phase transition temperature. It is appreciated that where the SMA is one-way in operation, a biasing force return mechanism (such as a spring) would be required to return the SMA to its starting configuration. Finally, it is appreciated that Joule heating can be used to make the entire system electronically controllable.

In the Austenite phase, stress induced phase changes in SMA exhibit a superelastic (or pseudoelastic) behavior that refers to the ability of SMA to return to its original shape upon unloading after a substantial deformation in a two-way manner. That is to say, application of increasing stress when SMA is in its Austenitic phase will cause the SMA to exhibit elastic Austenitic behavior until a certain point where it is caused to change to its lower modulus Martensitic phase where it can exhibit up to 8% of superelastic deformation. Removal of the applied stress will cause the SMA to switch back to its Austenitic phase in so doing recovering its starting shape and higher modulus, as well as dissipating energy under the hysteretic loading/unloading stress-strain loop. Moreover, the application of an externally applied stress causes martensite to form at temperatures higher than $M_s$. Superelastic SMA can be strained several times more than ordinary metal alloys without being plastically deformed, however, this is only observed over a specific temperature range, with the largest ability to recover occurring close to $A_f$.

Ferromagnetic SMA's (FSMA's), which are a sub-class of SMAs, may also be used in the present invention. These materials behave like conventional SMA materials that have a stress or thermally induced phase transformation between Martensite and Austenite. Additionally FSMA's are ferromagnetic and have strong magnetocrystalline anisotropy, which permit an external magnetic field to influence the orientation/fraction of field aligned Martensitic variants. When the magnetic field is removed, the material may exhibit complete two-way, partial two-way or one-way shape memory. For partial or one-way shape memory, an external stimulus, temperature, magnetic field or stress may permit the material to return to its starting state. Perfect two-way shape memory may be used for proportional control with continuous power supplied. External magnetic fields are generally produced via soft-magnetic core electromagnets in automotive applications, though a pair of Helmholtz coils may also be used for fast response.

Shape memory polymers (SMP's) generally refer to a group of polymeric materials that demonstrate the ability to return to a previously defined shape when subjected to an appropriate thermal stimulus. Thermally-activated shape memory polymers are polymers whose elastic modulus changes substantially (usually by one—three orders of magnitude) across a narrow transition temperature range, e.g., 0 to 150° C., depending upon the composition of the polymer, and which exhibits a finite rubbery plateau in the elastic response at temperatures above the transition range where the modulus remains fairly constant.

In addition to the elastic modulus, properties such as permeability to moisture, and refractive index also exhibit a significant change across the transition temperature range. Shape memory polymers activated by other stimuli, such as light, and humidity, show a similar behavior wherein change in properties occurs over a range of or corresponding to finitely separated discrete values of the specific stimulus.

These properties are the result of morphology of the polymer, which contains chains of atoms that are connected by two types of cross-links: irreversible and reversible. The latter can be broken by supplying sufficient thermal energy to raise the temperature of the polymer above the transition range in thermally-activated SMPs. In this condition, the chains in the polymer are held together only by the irreversible cross-links. Hence, the elastic modulus of the polymer is low and the material can be stretched to high strains (e.g. up to 300%). Due to a reduction in cross-links the polymer chains can move relative to each other by significant distances to accommodate the large strains without causing breakage of the reversible cross-links, and hence, without plastic failure. If this deformation is maintained while the polymer is cooled to a temperature below the transition range, the reversible cross-links are formed between the polymer chains in their new positions. The increased density of cross-links constrains the relative motions of the polymer chains and thus, increases the stiffness of the material. The newly formed reversible cross-links serve to lock in the deformation imparted to the polymer above the transition range.

Experiments have shown that the polymer can retain the deformed shape for extended periods of time (e.g., up to 6 months) as long as they are loaded within the elastic limit of the polymer below the transition range and the material temperature does not rise into or above the transition range. Subsequent heating of the polymer above the transition range causes the reversible cross-links to break, and if the material is free of external loads, to recover previously induced deformation above the transition range. The strain recovery is often nearly complete (e.g., 98% or more). Thus, SMPs can be imparted temporary shapes by deforming them above the transition range and cooling them below the transition range. The original shape can be recovered simply by heating the polymer above the transition range in the absence of external loads.

Depending on the nature of the polymer morphology a wide variety of SMPs can be formed. One way of classifying SMPs is based on the nature of the cross-links. The irreversible cross-links in thermoset SMPs are formed by covalent bonds. Thermoplastic SMPs do not have truly irreversible cross-links. They have two or more types of reversible cross-links that are formed and broken over finitely separated temperature ranges. Any of the temperature ranges across which the polymer behaves in the manner specified above can be treated as a transition range for the material. Typically, the lowest temperature range that falls within the range of normal operating conditions for the material is used as the transition range. When the material is heated above its transition range only the cross-links corresponding to this range and all lower ranges are broken. The cross-links that break and form at higher temperatures are unaffected, and play the role of irreversible cross-links in this class of SMP.

Reversible cross-links are secondary bonds that consist of H-bonds, ionic bonds, and van der Waals forces, which can cause linear chain molecules, especially those with the same tactility and negligible pendant groups, to crystallize. Irreversible cross-links produce entanglement and covalent cross-links, and may be reversible for some photo-activated SMPs. The backbone may be a thermoplastic (i.e., basically a one-dimensional covalent network of linear molecules). The links in the backbone are not cross-links, but rather are links between non-adjacent atoms in the chain. Thus, instead of a one-dimensional network, a non-cross-linked network is presented that flows easily when heated above a softening temperature due to the one-dimensional nature, which promotes relative sliding between backbone chain segments. As such, the polymer can be reshaped easily by heating above a softening temperature.

In thermoset SMPs, a three-dimensional covalent network presents a cross-linked network that does not flow when heated. Instead it burns or chars above a characteristic temperature because the three-dimensional covalent network restricts the motion of backbone chain segments. As such, better structural properties, as well as heat and chemical resistance is provided. In thermoplastic SMPs, the original/permanent shape is set by physical cross-links produced by the hard segment; whereas in thermoset SMPs, there may be no hard segment. The permanent shape is set by forming covalent cross-links between the (soft) segments.

Suitable polymer components to form a shape memory polymer include, but are not limited to, polyphosphazenes, poly(vinyl alcohols), polyamides, polyester amides, poly (amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), ply(butyl methacrylate), poly(isobutyl methacrylate), poly(hexyl methacrylate), poly(isodecyl methacrylate), poly (lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly (octadecyl vinyl ether) ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsequioxane), polyvinylchloride, urethane/butadiene copolymers, polyurethane block copolymers, styrene-butadiene-styrene block copolymers, and the like.

Thus, for the purposes of this invention, it is appreciated that SMP's exhibit a dramatic drop in modulus when heated above the glass transition temperature of their constituent that has a lower glass transition temperature. While SMP's could be used variously in block, sheet, slab, lattice, truss, fiber or foam forms, they require their temperature to be above the glass transition temperature of their constituent that has a lower glass transition temperature, i.e. a continuous power input in a low temperature environment to remain in their lower modulus state.

Figure 1A:
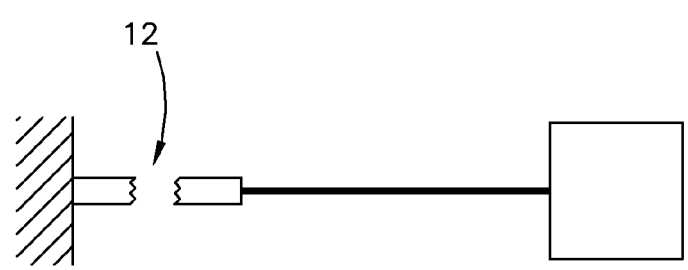
FIG. 1a is a schematic elevation of the assembly shown in FIG. 1, wherein the device has experienced a breakage failure caused by an overload condition.
Figure 2:
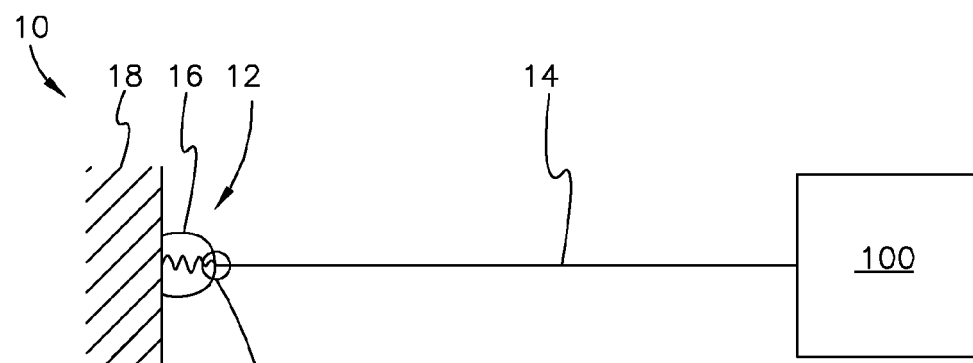
FIG. 2 is a schematic elevation of an assembly comprising an active material actuator having drivenly and oppositely attached thereto a load, and an overload protection device further including a shape memory polymer body, and in enlarged caption view, an orthogonal interconnection between the actuator and body, in accordance with a preferred embodiment of the invention.

Returning to the configuration of the present invention, the overload protection device 12 is configured to provide a secondary work output path (FIG. 1) for the actuator 14, so as to prevent or mitigate a mechanical overload condition (e.g., wherein tensile stress within an SMA wire actuator exceeds its tensile strength). In FIG. 2, for example, the actuator 14 essentially consists of a shape memory alloy wire, wherein the term "wire" shall be construed to include other tensile structures such as cables, braids, chains, etc., that perform equivalently. The wire 14 presents opposite work and fixed ends 14a,b, and is drivenly coupled to the load 100 at the work end 14a, wherein it is appreciated that either operative "end" may coincide with a structurally intermediate point (as in a bow-string actuator configuration). The overload protection device 12 is communicatively coupled to the actuator 14 at the fixed end 14b, and operable to occlude the actuator 14 from the load 100, when the load 100 actually exceeds or is predicted to exceed a predetermined threshold. In general, the device 12 presents a mechanical link operable to structurally fail when the load 100 exceeds a predetermined threshold (e.g., the lesser of the structural capacity of the actuator 14 or mechanism driven thereby times a factor of safety). That is to say the link 12 is modified so as to interrupt the transfer of the load 100, either by being deformed (e.g., inelastically stretching (FIG. 2a)) or by breaking the structural connection (FIG. 1a) when the load 100 exceeds the threshold. Lastly, and as previously mentioned the inventive device 12 is devoid of an automatic reset to reduce complexity, costs, and packaging requirements among other concerns.

In a first embodiment, the link 12 is presented by an oblong or spherical shape memory polymer body 16 attached to the fixed end 14b (FIG. 2) of the actuator 14. More particularly, the body 16 interconnects the fixed end 14b to fixed structure (i.e., a base) 18, such as the vehicle chassis, center console, or seat frame, in an automotive section. As shown in caption, the preferred body 16 and wire 14 are cooperatively configured to present a transverse, and more preferably, orthogonal interconnection, such that at least a portion of the body 16 uses its compressive and/or shear strength to transfer the load 100 as opposed to relying strictly upon surface friction between the two parts. As shown in FIG. 2, for example, an end section of the actuator 14 may laterally define a donut shaped indentation co-axial with the actuator 14, which circumferentially entraps some of the SMP. The actuation force vector drawn towards the centroid of the wire 14 normally engages the entrapped portion.

Figure 2A:
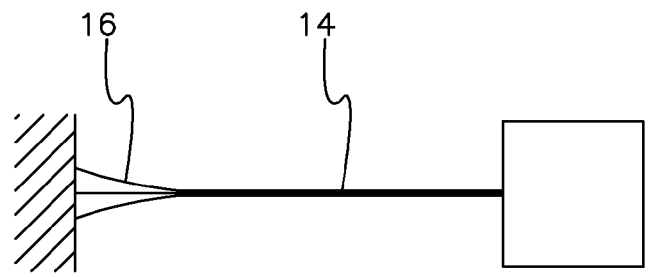
FIG. 2a is an elevation of the assembly shown in FIG. 2 after the body has been activated and stretched during overload protection, in accordance with a preferred embodiment of the invention.

When the load 100 exceeds the structural capacity of the link 12, for example, the body 16 is designed to fail either by the load 100 solely, or by first being activated, so as to achieve a lower modulus, "remember" an alternate shape that facilitates failure, or both. As shown in FIG. 2a, the body 16 may fail by being deformed (e.g., inelastically stretching) or by deformation and breaking. It is appreciated that sudden breakage may also be employed. Whether simply deformed or deformed and broken, the body 16 may be returned to its original shape by heating it past its glass transition temperature and molding it as desired. Thus, the preferred body 16 is composed and geometrically configured relative to anticipatory loadings, so as to provide a first condition (e.g., a stabilizing, durable, and/or vibratory dampening link) when not in use, and a readily employed overload protector when activated.

Where the actuator 14 is activated by a thermal signal (e.g., a normally Martensitic SMA wire), it is appreciated that the SMP body 16 may be passively activated by the signal. For example, it may be activated by heat by-product emanating from the actuator 14 or from another heat source, such as a vehicle engine, cooling system, etc. Alternatively, where the actuator 14 is activated through Joule heating by an electric current, the link 12 may also be electrically conductive. In this configuration, the actuator 14 and link 16 are electrically connected in series and preferably configured such that the current activates the SMA prior to activating the SMP or such that they are both heated simultaneously. To that end, the link 12 may further comprise a resistive lead (e.g., copper wire) 20 partially disposed within the SMP body 16 and communicatively coupled to a source (not shown) and the actuator 14.

Figure 3:
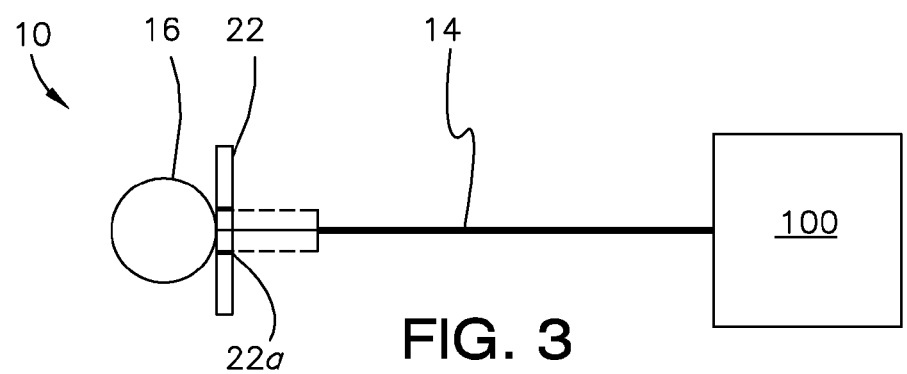
FIG. 3 is a schematic elevation of an assembly comprising an active material actuator having drivenly attached thereto an overload protection device comprising a shape memory polymer or alloy body and a hard stop defining an orifice, and in hidden-line type the body after being activated and passed through the orifice during overload protection, in accordance with a preferred embodiment of the invention.

In another example, where the oblong or spherically shaped SMP body 16 defines a maximum cross-sectional diameter, the device 12 further includes a spatially fixed hard stop 22 defining a circular orifice 22a having a cross-sectional diameter less than the maximum body diameter (FIG. 3). The hard stop 22 is positioned in accordance with the wire length, so as to abut the body 16 opposite the centroid of the wire 14, and form an anchor or base during normal actuator operation. In this configuration, the body 16 is activated either passively or actively as described above, so as to be able to achieve a lower modulus, remember a shape that facilitates passage through the orifice 22a, or both. With respect to shape memory, the oblong body 16 may be caused to remember a cylindrical or capsule shape having a maximum diameter slightly (e.g., 1-5% greater) larger than that of the orifice 22a. When the load 100 exceeds the predetermined threshold, the activated body 16 is pulled through the orifice 22a thereby resulting in a secondary work output path. After use, it is appreciated that the body 16 may be manually passed back through the orifice 22a and then molded back to the oblong or spherical shape for future use. Upon recovery of up to 8% strain, the SMA wire 14 is preferably pre-stretched so that the body 16 is caused to bear upon the stop 22 once again.

Figure 4:
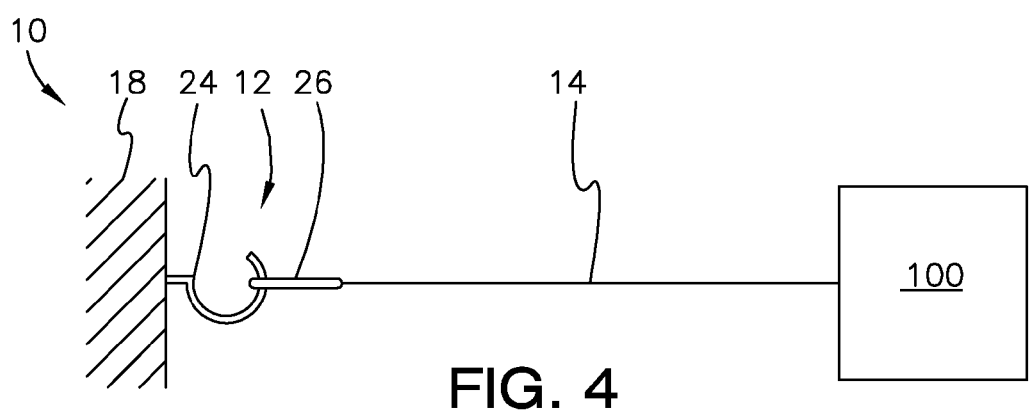
FIG. 4 is a schematic elevation of an assembly comprising an active material actuator having drivenly attached thereto an overload protection device comprising a loop and an active material hook coupled to the loop, in accordance with a preferred embodiment of the invention.
Figure 4A:
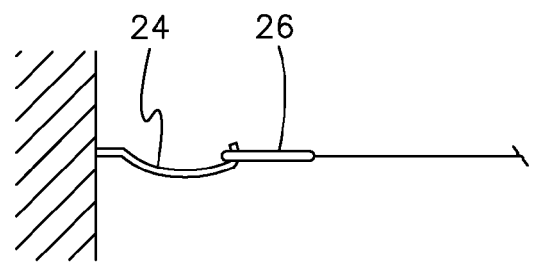
FIG. 4a is a partial elevation of the assembly shown in FIG. 4, wherein the hook has been (activated and) stretched prior to releasing the loop, during an overload event.

In another example, the link 12 may include a hook 24 and loop 26 (FIGS. 4 and 4a). It is appreciated that either the hook 24 or loop 26 may be connected to the actuator 14 where the other is fixedly attached to the base 18. The hook 24 is composed and geometrically configured to be overcome and straightened by a load 100 greater than a predetermined threshold, wherein the hook 24 is elastically or inelastically deformed (FIG. 4a). In a preferred embodiment the hook 24 is formed at least in part by shape memory polymer, so as to provide first and second thresholds depending upon whether the polymer has been activated. That is to say, when the SMP is heated past its glass transition temperature range, the hook 24 may be more facilely caused to straighten, such that overload protection is provided at a lower threshold. Again, the hook 24 may be passively or actively activated. Upon release of the hoop 26, the hook 24 may be manually molded back to a bent configuration, so as to be able to re-engage the hoop 26.

Alternatively, activation may solely cause the release of the loop 26, where the SMP hook 24 is taught to remember a straightened configuration when activated. In this configuration, hook activation is preferably coordinated so as to occur where overloading is predicted, e.g., after Joule heating the actuator 14 for a set period greater than a normal activation period and/or detecting no displacement at the work end 14a.

Similarly, in another example, the hook 24 (FIG. 4) may be formed of superelastic or normally Austenitic shape memory alloy. That is to say, the shape memory alloy presents an Austenitic finish temperature less than the lowest anticipated operating temperature of the actuator 14 (e.g., less than −30° C. for automotive settings). In this configuration, the rigidity of the hook 24 is modified by the load 100 prior to deforming it, as the stress/strain applied to the hook 24 functions to instantaneously transform the SMA to its more malleable Martensite phase when the predetermined threshold is met. Thus, the wire actuator 14 and hook 24 are cooperatively configured such that the maximum actuation force offered by the wire 14 is operable to transform the SMA at the inception of, and then stretch the low modulus hook 24 during overloading. It is appreciated that upon achieving the Martensite phase, the hook 24 is able to straighten more readily thereby facilitating overload protection as loading increases. When the loop 26 is released, the hook 24 reverts back to the Austenitic phase and its normal configuration, enabling the hook 24 and loop 26 to be manually re-engaged. Thus, the Ni—Ti composition and geometric configuration (e.g., cross-sectional area) of the hook 24 is directed by the anticipatory loading of the assembly 10. Finally, it is appreciated that a normally Martensitic hook 24 may also be employed to remember a straightened configuration, where overloading is predicted similar to the above-described SMP hook. Here, it is appreciated that the hook 24 and wire actuator 14 are cooperatively configured so as to effect the intended timing of activation, whether passively or actively.

This invention has been described with reference to exemplary embodiments; it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. All ranges directed to the same quantity of a given component or measurement is inclusive of the endpoints and independently combinable.

What is claimed is:

1. An active material actuator assembly exposable to a first load, and adapted to protect against an actual or predicted overload condition, said assembly comprising:
   an active material actuator having opposite work and fixed ends, drivenly coupled to the first load at the work end, and operable to undergo a first change in fundamental property when exposed to and occluded from a first activation signal, so as to be activated and deactivated respectively; and
   an active material overload protection device communicatively coupled to the actuator at the fixed end, operable to undergo a second change in fundamental property when exposed to and occluded from a second activation signal, so as to be activated and deactivated respectively, and configured to occlude the actuator from the first load when the first load exceeds a predetermined threshold;
   and not an automatic reset, such that the actuator is exposable to a second load only after the active material overload protection device has been either manually reset or replaced.

2. The assembly as claimed in claim 1, wherein the active material actuator includes a shape memory alloy wire.

3. The assembly as claimed in claim 1, wherein the predetermined threshold is a first threshold when the device is activated and a second threshold differing from the first threshold when the device is deactivated.

4. The assembly as claimed in claim 1, wherein the active material overload protection device includes a mechanical link operable to structurally fail when the load exceeds the predetermined threshold.

5. The assembly as claimed in claim 4, wherein the link is configured to inelastically stretch when the load exceeds the predetermined threshold.

6. The assembly as claimed in claim 4, wherein the link is configured to break when the load exceeds the threshold.

7. The assembly as claimed in claim 4, wherein the link is formed of shape memory polymer, the actuator is activated by a thermal signal, and the polymer is passively activated by the thermal signal when the load exceeds the threshold.

8. The assembly as claimed in claim 4, wherein the link is formed of shape memory polymer and is electrically conductive, the actuator is activated by an electric current, and the actuator and polymer are electrically connected in series such that the current further activates the polymer.

9. The assembly as claimed in claim 4, wherein the link includes a shape memory polymer body defining a first cross-sectional diameter, and the device further includes a stop defining an orifice having a cross-sectional diameter less than the first diameter and abuts the body, such that the body is able to pass through the orifice only when activated.

10. The assembly as claimed in claim 4, wherein the link includes a shape memory polymer body, and the actuator and body are cooperatively configured such that at least a portion of the actuator orthogonally engages the body, so as to apply a compressive/shear stress to the body during the overload condition.

11. The assembly as claimed in claim 4, wherein the link includes a shape memory polymer hook, the device further includes a loop, and the hook is caused to straighten and release the loop as a result of being activated when the load is predicted to exceed the threshold.

12. The assembly as claimed in claim 11, wherein the hook is caused to straighten and release the loop only when the polymer is activated and the load exceeds the threshold.

13. The assembly as claimed in claim 4, wherein the link includes a normally Austenitic shape memory alloy hook, the device further includes a loop, and the hook is activated and caused to straighten and release the loop by the load when the load exceeds the threshold.

14. The assembly as claimed in claim 4, wherein the link includes a normally Martensitic shape memory alloy hook, the device further includes a loop, and the hook is activated and caused to straighten and release the loop as a result of being activated when the load is predicted to exceed the threshold.

15. An active material actuator assembly exposable to a first load, and adapted to protect against an actual or predicted overload condition, said assembly comprising:
   a shape memory alloy wire having opposite work and fixed ends, drivenly coupled to the first load at the work end, and operable to undergo a change in fundamental property when exposed to and occluded from a first activation signal, so as to be activated and deactivated respectively; and
   an overload protection device communicatively coupled to the actuator at the fixed end, and operable to occlude the actuator from the first load when the first load exceeds a predetermined threshold;
   and not an automatic reset, such that the actuator is exposable to a second load only after the overload protection device has been manually reset or only after the overload protection device has been replaced;
   wherein the overload protection device includes a shape memory polymer body presenting a first material strength, and operable to undergo a second change in fundamental property when exposed to and occluded from a second activation signal, the second change is operable to modify the material strength to achieve a second material strength, and the actuator is occluded from the first load as a result of achieving the second material strength.

16. An active material actuator assembly exposable to a first load, and adapted to protect against an actual or predicted overload condition, said assembly comprising:
   a shape memory alloy wire having opposite work and fixed ends, drivenly coupled to the first load at the work end, and operable to undergo a change in fundamental property when exposed to and occluded from a first activation signal, so as to be activated and deactivated respectively; and
   an overload protection device communicatively coupled to the actuator at the fixed end, and operable to occlude the actuator from the first load when the first load exceeds a predetermined threshold;
   and not an automatic reset, such that the actuator is exposable to a second load only after the overload protection device has been manually reset;
   wherein the overload protection device includes a shape memory polymer body presenting a first shape, and operable to undergo a second change in fundamental property when exposed to and occluded from a second activation signal, the second change being operable to modify the shape memory polymer body so as to achieve a second shape, and the actuator is occluded from the first load as a result of achieving the second shape.

* * * * *